(12) United States Patent
Väinämö et al.

(10) Patent No.: US 10,099,762 B2
(45) Date of Patent: Oct. 16, 2018

(54) METHOD OF MANUFACTURING A ROTOR BODY OF A MAGNUS-TYPE ROTOR

(71) Applicant: Norsepower Oy Ltd, Helsinki (FI)

(72) Inventors: Jarkko Väinämö, Espoo (FI); Martin Hilderbrand, Helsinki (FI); Christopher Stanley, Ranua (FI)

(73) Assignee: Norsepower Oy Ltd, Helsinki (FI)

( * ) Notice: Subject to any disclaimer, the term of this patent is extended or adjusted under 35 U.S.C. 154(b) by 0 days.

(21) Appl. No.: 15/126,722

(22) PCT Filed: Mar. 24, 2015

(86) PCT No.: PCT/FI2015/050198
§ 371 (c)(1),
(2) Date: Sep. 16, 2016

(87) PCT Pub. No.: WO2015/150624
PCT Pub. Date: Oct. 8, 2015

(65) Prior Publication Data
US 2017/0088245 A1 Mar. 30, 2017

(30) Foreign Application Priority Data
Mar. 31, 2014 (GB) .................................. 1405794.7

(51) Int. Cl.
*B63H 9/02* (2006.01)
(52) U.S. Cl.
CPC ............ *B63H 9/02* (2013.01); *B63B 2231/52* (2013.01); *B63B 2745/04* (2013.01); *Y02T 70/58* (2013.01)
(58) Field of Classification Search
CPC ... B63H 9/02; B63B 2231/52; B63B 2745/04; Y02T 70/58; F03D 13/35; F05B 2240/201
(Continued)

(56) References Cited

U.S. PATENT DOCUMENTS

2008/0233347 A1* 9/2008 Chefdeville .......... B29C 70/088
428/116
2009/0241820 A1 10/2009 Rohden
(Continued)

FOREIGN PATENT DOCUMENTS

DE 102006034873 A1 2/2008
DE 102010040915 A1 3/2012
(Continued)

OTHER PUBLICATIONS

Vacman, What is resin infusion (or vacuum infusion)?, Jun. 2012, located at: https://www.vacmobiles.com/site/vacmobiles/files//Vacman's%20Notes%20-%20what%20is%2Oresin%20infusion.pdf.*
(Continued)

*Primary Examiner* — Eldon Brockman
(74) *Attorney, Agent, or Firm* — Ziegler IP Law Group, LLC

(57) ABSTRACT

A method is provided for manufacturing a rotor body of a Magnus-type rotor. The method includes providing a plurality of arcuate panels, wherein each of the panels has an arc-length less than a predetermined circumference of the rotor body. The method further includes positioning at least three such arcuate panels in mutual edge-wise abutment to form circumferentially a hollow cylindrical loop, wherein longitudinal edges of adjacent panels are mutually attached to each other. The method further optionally includes co-axially stacking one above another at least two loops of substantially similar diameter. The method further includes connecting edges of adjacent loops to define the rotor body of a predetermined height.

17 Claims, 9 Drawing Sheets

(58) Field of Classification Search
USPC .......................................................... 416/4
See application file for complete search history.

(56) References Cited

U.S. PATENT DOCUMENTS

| | | |
|---|---|---|
| 2013/0042798 A1 | 2/2013 | Holohan et al. |
| 2013/0055944 A1 | 3/2013 | Poulsen |
| 2013/0239859 A1 | 9/2013 | Rohden |
| 2013/0302164 A1* | 11/2013 | Rohden .................. B63H 9/02 416/4 |
| 2014/0196648 A1 | 7/2014 | Holohan et al. |
| 2016/0332712 A1 | 11/2016 | Holohan et al. |

FOREIGN PATENT DOCUMENTS

| | | |
|---|---|---|
| GB | 2477078 A | 7/2011 |
| KR | 10-2009-0016607 A | 2/2009 |
| KR | 10-2012-0029004 A | 3/2012 |
| KR | 10-2014-0024469 A | 2/2014 |
| WO | 2007/087197 A2 | 8/2007 |
| WO | 2007/137844 A2 | 12/2007 |
| WO | 2010116024 A2 | 10/2010 |
| WO | 2012/035073 A1 | 3/2012 |
| WO | 2012035090 A1 | 3/2012 |
| WO | 2012/178006 A2 | 12/2012 |
| WO | 2013110695 A1 | 8/2013 |

OTHER PUBLICATIONS

DE102006034873 (Sause); English Translation via www.worldwide.espacenet.com.*
International Search Report and Written Opinion, Application No. PCT/FI2015/050198, dated Jul. 17, 2015, 11 pages.
PCT Demand for International Preliminary Examination (Chapter II), Application No. PCT/FI2015/050198, dated Jun. 10, 2015, 13 pages.
Notification of Transmittal of the International Preliminary Report on Patentability, Application No. PCT/FI2015/050198, dated Mar. 16, 2016, 6 pages.
Office Action received for Korean Patent Application No. 9-5-2017-059437608, dated Aug. 25, 2017, 25 pages including 13 pages of English translation.
Combined Search and Examination Report received for United Kingdom Patent Application No. GB1405794.7, dated Sep. 25, 2014, 5 pages.
Examination Report received for United Kingdom Patent Application No. GB1405794.7, dated Feb. 11, 2015, 2 pages.

* cited by examiner

METHOD OF MANUFACTURING A ROTOR BODY OF A MAGNUS-TYPE ROTOR

TECHNICAL FIELD

The present disclosure generally relates to Magnus-type rotors for propelling aquatic vessels, and more specifically to methods of manufacturing a rotor body of the Magnus-type rotors.

BACKGROUND

Conventionally, a propulsion system for an aquatic vessel includes one or more propellers for propelling the aquatic vessel. However, in recent times, the marine industry is making new attempts to harvest wind power to propel such aquatic vessels. One area of specific interest to the marine industry is to develop Magnus-type rotors for use with aquatic vessels. The Magnus-type rotors are optionally configured for supplementing the propellers of the aquatic vessels. As a result of harnessing wind power, Magnus-type rotors show immense promise and potential for use with aquatic vessels.

Given the large size and weight of a Magnus-type rotor, manufacturers of Magnus-type rotors are continuously developing improved methods of designing and manufacturing rotor bodies for use with aquatic vessels. As such, manufacturers of Magnus-type rotors are often faced with challenges in maintaining various desirable structural properties and/or parameters in the Magnus-type rotors. Some examples of such properties optionally include, but are not limited to: a low weight, resistance to corrosion, a high structural integrity and/or stiffness of the rotor body, a uniform mass distribution in the rotor body across various cross-sectional and/or symmetrical planes thereof, and balanced weight of the rotor body under operation.

A U.S. patent application 2009/0025304 (hereinafter referred to as '304 Publication) relates to methods of manufacturing large cylindrical objects from segmented components. However, such methods of manufacturing are potentially not applicable in a case of the rotor body, because Magnus-type rotors are typically required to operate in conditions that are different to those of the cylindrical objects described in the '304 publication. For example, the Magnus-type rotors are potentially required to rotate at high speeds and/or varying load conditions.

The published patent application WO2013/110695 discloses a Magnus effect rotor where the rotor is allowed to be displaced towards the deck of the vessel in an inoperable state. The construction of the rotor there is a rigid cylinder which is made up of cylindrical sections. The cylindrical sections are made up of plates, which plates are assembled into longitudinally connected cylindrical body sections.

The published patent application US2013/0055944 discloses manufacturing of a Flettner rotor. The rotor is formed by element comprising individual sheets or bands welded together or otherwise joined in order to present a continuous, smooth, largely cylindrical surface.

Also in published patent application US2013/0239859, a Magnus rotor is disclosed which has guide rollers and covers. This construction has covers that prevent foreign bodies passing into the drive of the rollers and also prevents operating personnel being injured.

Typically, in some cases, manufacturers employ a single-piece casting technique in which an entire rotor body is cast as a single unit for use with a support tower of the Magnus-type rotor. In other cases, manufacturers alternatively employ a half-shell casting method in which two halves of the rotor body are individually cast and then joined together to make up a total volume of the rotor body. However, with the use of such techniques, large molds and associated system hardware or equipment are potentially required. Moreover, time and labour required to manufacture the rotor body is often high. Furthermore, costs associated with manufacturing, assembling, and logistics handling of the rotor body are also potentially high.

The aforesaid previously known techniques do not allow the manufacturing process to be controlled for obtaining or achieving desirable structural properties. For example, rotor bodies produced from such previously known techniques potentially have a non-uniform mass distribution and/or a non-consistent stiffness in various cross-sectional and/or symmetrical planes of the rotor body. Consequently, the rotor bodies produced from such previously known techniques are potentially subject to detrimental effects such as, but not limited to, uneven rotation, wobbling, and/or deformation in shape of the rotor body during operation.

Therefore, taking into account the aforementioned drawbacks, there exists a need for a method of manufacturing a rotor body, whereby a manufacturer is able to control easily the processes of manufacturing the rotor body to obtain desirable structural characteristics therefrom. Moreover, there also exists a need for constructing a rotor body of even mass distribution, low weight, high and uniform stiffness, while entailing reduced costs, and less time and effort associated with manufacturing, assembling, logistics handling and operating of associated Magnus-type rotors.

BRIEF SUMMARY

The present disclosure seeks to provide improved methods of manufacturing a rotor body of a Magnus-type rotor as well as an improved rotor body and an improved Magnus-type rotor.

In one aspect, embodiments of the present disclosure disclose a method of manufacturing a rotor body of a Magnus-type rotor, the method comprising
(i) providing at least three arcuate panels having a multilayer structure, wherein each panel has an arc-length less than a circumference of the rotor body of the Magnus-type rotor;
(ii) positioning the at least three arcuate panels in mutual abutment at two opposing edges of each arcuate panel; and
(iii) connecting the at least three arcuate panels together by attaching the opposing edges of adjacent arcuate panels to each other, to form circumferentially a hollow cylindrical loop usable as at least a part of the rotor body of the Magnus-type rotor.

Moreover, in an aspect, the present disclosure also relates to a rotor body obtainable by the method disclosed herein. Further, the present disclosure also relates to Magnus-type rotors including a support tower, and a rotor manufactured using the methods of the present disclosure. Yet further, the present disclosure relates to a Magnus-type rotor, comprising a support tower and a rotor body, the rotor body comprising at least three arcuate panels having a multilayer structure, wherein each panel has an arc-length less than a circumference of the rotor body, the arcuate panels being attached to each other at two opposing edges of each arcuate panel, to form circumferentially a hollow cylindrical loop forming at least a part of the rotor body.

Embodiments of the present disclosure are capable of substantially eliminating the aforementioned problems in the prior art. Further, embodiments of the present disclosure mitigate detrimental effects experienced by rotor bodies manufactured from previously known methods such as, but not limited to, high costs, high weight, uneven mass distribution, low and/or non-uniform stiffness, and deformation during operation of the rotor body. Furthermore, embodiments of the present disclosure impart flexibility to a manufacturer in terms of process control, assembly, and logistics.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating embodiments of the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
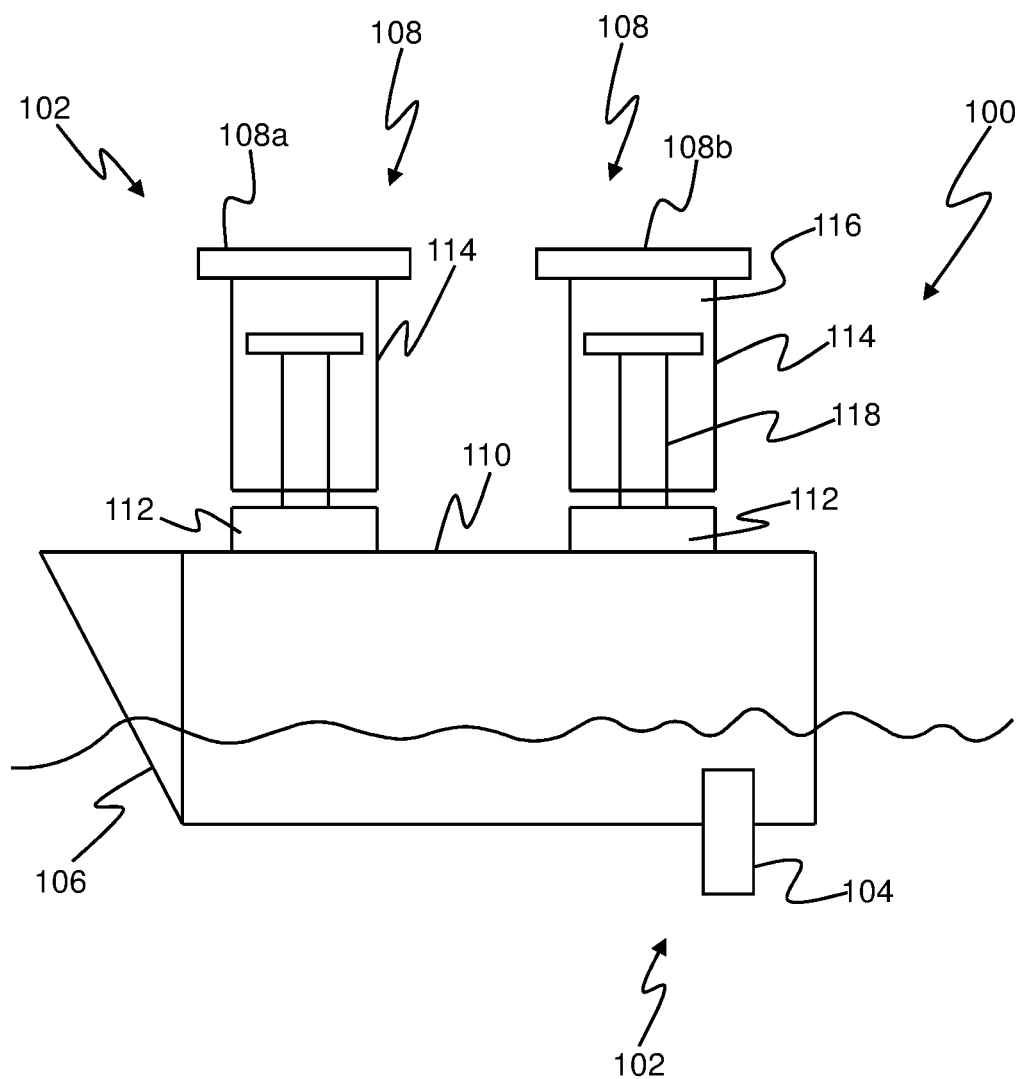
FIG. 1 is a schematic illustration of a propulsion system for an aquatic vessel, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS OF THE DISCLOSURE

The following detailed description illustrates embodiments of the present disclosure and ways in which they can be implemented. Although the best mode of carrying out the present disclosure has been disclosed, those in the art would recognize that other embodiments for carrying out or practicing the present disclosure are also possible.

In one aspect, embodiments of the present disclosure concern a method of manufacturing a rotor body of a Magnus-type rotor, the method comprising (i) providing at least three arcuate panels having a multilayer structure, wherein each panel has an arc-length less than a circumference of the rotor body of the Magnus-type rotor;

(ii) positioning the at least three arcuate panels in mutual abutment at two opposing edges of each arcuate panel; and (iii) connecting the at least three arcuate panels together by attaching the opposing edges of adjacent arcuate panels to each other, to form circumferentially a hollow cylindrical loop usable as at least a part of the rotor body of the Magnus-type rotor.

In the present invention, by the opposing edges of the arcuate panels are meant the sides (of which each panel typically has four) that would be opposing each other if the panels were flat, i.e. side edges or the edges at the top and bottom of the panel. The opposing edges are furthermore those sides that will be along the longitudinal direction of the rotor body, once it is finished. The longitudinal direction is also the direction of the axis of the rotor body. Indeed, the rotor body has a circumference and a length, wherein the length is typically significantly larger than the circumference. The length corresponds to the height of the rotor body when it is in its normal operating position, i.e. upright.

In another aspect, embodiments of the present disclosure pertain to a method that comprises (iv) forming at least one further hollow cylindrical loop of substantially similar diameter by positioning and connecting to each other at least three further arcuate panels;

(v) stacking, co-axially one above another, the at least two hollow cylindrical loops; and (vi) connecting the edges of adjacent loops to define the rotor body of the Magnus-type rotor.

The rotor body may thus be made of one hollow cylindrical loop, wherein the length (height) of each arcuate panel is equal to the length (height) of the finished rotor body, or it may be made of more than one hollow cylindrical loop arranged coaxially one on top of another. It may be made of for example two, three, four, five, six, seven, eight, nine, ten or more cylindrical loops. Each loop may also be made of more than three arcuate panels, and not all loops need to have the same number of arcuate panels or the same length (height). Indeed, additionally, the method also includes providing the arcuate panels with a height which is less than the (predetermined) height of the rotor body. Optionally, the method also includes providing the arcuate panels with a height equal to the predetermined height of the rotor body.

It would also be possible to manufacture the rotor body by firstly attaching arcuate panels to each other to form an element having the length of the finished rotor body, and to then attach thereto another (one or more) element having also the length of the finished body, i.e. to form a hollow cylindrical loop after stacking arcuate panels on top of one another.

Moreover, the arcuate panels may be formed by employing a resin infusion process. However, it will be appreciated that other approaches to manufacturing the arcuate panels are feasible, pursuant to the present disclosure; for example, prepreg, namely pre-impregnated but not fully hardened composite material, is optionally employed when manufacturing the arcuate panels. According to another embodiment, the panels are manufactured from at least one self-carrying composite material. The self-carrying composite material is optionally selected from one or more of: fiberglass reinforced plastics materials (FRP), carbon reinforced plastics materials (CRP), glass reinforced plastics materials (GRP), aramid reinforced plastics materials, basalt reinforced plastics materials and combinations thereof. However, other types of materials are optionally or additionally employed in lieu of the self-carrying composite materials, for example high-strength ceramics materials, nano-fibres and similar. Moreover, various lightweight materials such as, but not limited to, ship building materials can be used in lieu of the self-carrying composites mentioned above. Optionally, the composite materials employed are implemented as a sandwich design, including a core material. The core material, for example, includes one or more of: polyvinylchloride foam, polyethylene foam, polystyrene foam, balsa wood, syntactic foams, honeycomb-like structures. Moreover, in respect of manufacturing the arcuate panels, a self-carrying composite employed in their manufacture optionally means a multilayer structure, for example a sandwich-like structure devoid of a need for a separate load-carrying and load-transmitting structure.

Moreover, the longitudinal, opposing edges of adjacent panels are mutually attached to each other by using one or more of: an adhesion process, an over-lamination process, and a fastening mechanism, wherein the fastening mechanism optionally includes at least one of adhesive fasteners, bolts, rivets, pins, and screws. The edges of adjacent loops may also be attached to each other using one of these techniques.

Additionally, the method further includes balancing a weight of the rotor body across the circumference thereof. Optionally, a weight of each loop is individually balanced across its circumference. Alternatively, the step of positioning at least three arcuate panels in edge-wise abutment optionally includes using at least three arcuate panels of substantially similar mass properties therein, i.e. the arcuate panels of one loop have substantially similar or identical mass properties. Moreover, an inner surface of the rotor body is optionally affixed with one or more balancing members, wherein each balancing member is optionally located based on an overall weight distribution across the circumference of the rotor body.

Indeed, the panels may themselves has different weights, either slightly due to the manufacturing technique, or a greater difference due to significant variations in size. However, it is necessary for the rotor body to have a well balanced weight, as during use, it is subjected to strong centrifugal forces, which will cause any heavier areas to extend towards the outside of the rotor body, hence deforming its shape. Moreover, in some embodiments, the joint area is heavier than the panel material (due to additional material or attachment means) and this would cause the heavier areas to extend outside under fast rotation. For compensating this, one or more balancing members are located between the longitudinal edges of the segment. This evens the circumferential mass distribution and is hence beneficial for maintaining the roundness of the cross section as accurately as possible under very fast rotation. Minimizing the out-of-roundness also results in a better lift coefficient for the finished device. As the lift coefficient influences the total efficiency of the Magnus rotor, its optimising has a significant impact on the rotor. It is also to be noted that the fact that the joints that are circumferential (i.e. the joints between two loops stacke on top of each otehr) are also slightly heavier than the arcuate panels, does not have an influence on the roundness of the cross section, as they extend over the whole cross section.

According to an embodiment, a balancing member is arranged approximately in the middle of each arcuate panel. By middle, it is here understood the middle of the panel between the two opposing, longitudinal edges, i.e. the edges used for attacing the panel to the other panels for forming the loop. Hence, for example for a loop made of three arcuate panels, there are six heavier sections in the loop, i.e. the three joint areas between the panels and the three balancing members in the middle of each panel. Thus the roundness of the loop is better maintained during using of the device. In a loop made of four arcuate panels, there would be preferably eight such heavier sections and the roundness would be even better maintained.

The balancing members may also be of two different types, namely balancing members designated to balance the difference of weight of the joints between the panels and balancing members designated to balance the overall structure, i.e. difference of weight due to manufacturing process or other structural aspects. The first type of balancing members (which may also be called joint balancing members) can be incorporated into the arcuate panels already during their manufacture, for example as a an additional strip of material in the layered structure. The second type of balancing members (which may also be called mass balancing members) are typically added during the balancing process, i.e. testing of the loop or the finished rotor body, and hence their location in the loop and thus rotor body varies from one loop to another. As mentioned, balancing each individual loop is preferred as it is significantly easier and hence cheaper to perform.

It has been noted that balancing each loop individually offers significant advantages over balancing the finished rotor body. Indeed, it is usually sufficient to balance each loop and hence balancing of the finished rotor body is no longer required. Considering that the finished rotor body can have a diameter of up to 5 meters and a height of up to 30 meters, whereas one loop can have a height of for example only 3 meters, this is a clear advantage in the manufacturing process. Moreover, even if the finished rotor body still needs balancing, it is made considerably easier as a major part of the imbalances have already been corrected.

According to another embodiment, in case of loops being stacked, adjacent loops are counter-rotated to offset the longitudinal edges of the panels in the stacked loops. According to a preferred embodiment, each loop is first individually balanced and only thereafter stacked. Some advantages in using multilayer structures arcuate panels in smaller sections as in the present description are an easier control of shrinkage of the panels during the manufacture. Indeed, the relative shrinkage of the smaller segmented parts is less than if the loops were made in only two parts (i.e. two halves) and therefore the out-of-roundness of the outer surface is better controlled. Further, the resin flow during a resin infusion process (if used) is easier to control, as the smaller arcuate panels, in which the cross-section height is less than in a full or halved model, have more accurate resin flow in the vacuum resin infusion than components having larger vertical distance between the lower and upper ends. This enables more equal resin distribution and hence also mass distribution in the finished arcuate panels. A yet further advantage is that when the arcuate panels are made in a smaller scale, the molds are smaller and the lay-up process can be more accurate and faster. Indeed, no jigs or fixtures are needed. Another advantage is that the process requires only common tools, which are relative cheap and easy to obtain.

A yet further advantage of smaller arcuate panels is that each segment can be weighed separately and mated with other segments with corresponding properties in an easier manner than if large panels are used. Another advantage of this production method relates to supply chain management, as the manufacture of the arcuate panels (and optionally their assembly to form the rotor body) and the manufacture of the rotor itself can be done different places. Hence it is typically easier to find production facilities and staff. A yet further advantage is that the arcuate panels can be manufactured at one site and the actual assembly in another, as the panels are easier to transport than the whole rotor body. For example, the panels can be manufactures centrally in one or two locations and the assembly done close to shipyards. It is also possible to manufacture the panels and the small loops at one location and stacking of the loops to form the rotor body in another location.

Moreover, in an aspect, there is provided a rotor body manufactured using the methods disclosed herein, i.e. obtainable by a method according to this description. Furthermore, there are also provided Magnus-type rotors including a support tower, and employing the rotor manufactured using the methods of the present disclosure. Moreover, it is also disclosed that, for a given Magnus-type rotor, the predetermined height of the rotor body is more than a height of the support tower, and in which the support tower is optionally configured to support the rotor body at more than 50% of the height of the rotor body.

The present description yet further relates to a Magnus-type rotor, comprising a support tower and a rotor body, wherein the rotor body comprises at least three arcuate panels having a multilayer structure, wherein each panel has an arc-length less than a circumference of the rotor body, the arcuate panels being attached to each other at two opposing edges of each arcuate panel, to form circumferentially a hollow cylindrical loop forming at least a part of the rotor body. According to an embodiment, the rotor body comprises at least two hollow cylindrical loops stacked co-axially one above another and connected to each other, each loop comprising at least three arcuate panels. According to yet another embodiment, the longitudinal edges of the arcuate panels in the co-axially stacked loops are offset one from another.

Moreover, embodiments of the present disclosure are suitable for aquatic vessels such as, but not limited to, passenger ships, cargo ships, ferries, special-purpose ships, naval vessels and boats. The present disclosure thus also relates to a nautical vessel comprising at least one Magnus-type rotor according to this description.

Referring now to the drawings, particularly by their reference numbers, FIG. 1 is a schematic illustration of an aquatic vessel 100 employing a propulsion system 102 in accordance with an embodiment of the present disclosure. The propulsion system 102 optionally includes one or more propellers 104 located on an underside of a hull 106 of the aquatic vessel 100. The propellers 104 optionally include, for example, axial thrusters, or are optionally of any other type known in the art. The propellers 104 are optionally mounted at the bow and/or the stern of the aquatic vessel 100. Alternatively, or additionally, the propulsion system 102 optionally includes one or more water jet propulsion arrangements.

The propulsion system 102 also includes a plurality of Magnus-type rotors, depicted as a Magnus-type rotor 108a, and a Magnus-type rotor 108b, hereinafter collectively referred to as Magnus-type rotors 108. The Magnus-type rotors 108 are beneficially spatially positioned at various regions of a deck 110 of the aquatic vessel 100. For example, the Magnus-type rotors 108 are optionally spatially positioned in proximities of corners of the deck 110, namely, port and starboard sides of the bow and the stern. Alternatively, the Magnus-type rotors 108 are optionally spatially positioned in proximity of a middle region of the deck 110, the stern, or the bow of the aquatic vessel 100. The Magnus-type rotors 108 are optionally suitably positioned depending on, for example, a number of Magnus-type rotors set up on the deck 110 of the aquatic vessel 100, the size of the Magnus-type rotors 108, and/or a size and/or shape of the aquatic vessel 100. The Figure also shows a foundation 112, a rotor body 114, a hollow region 116 therein and a support tower 118, which are explained in more detail below.

Figure 2:
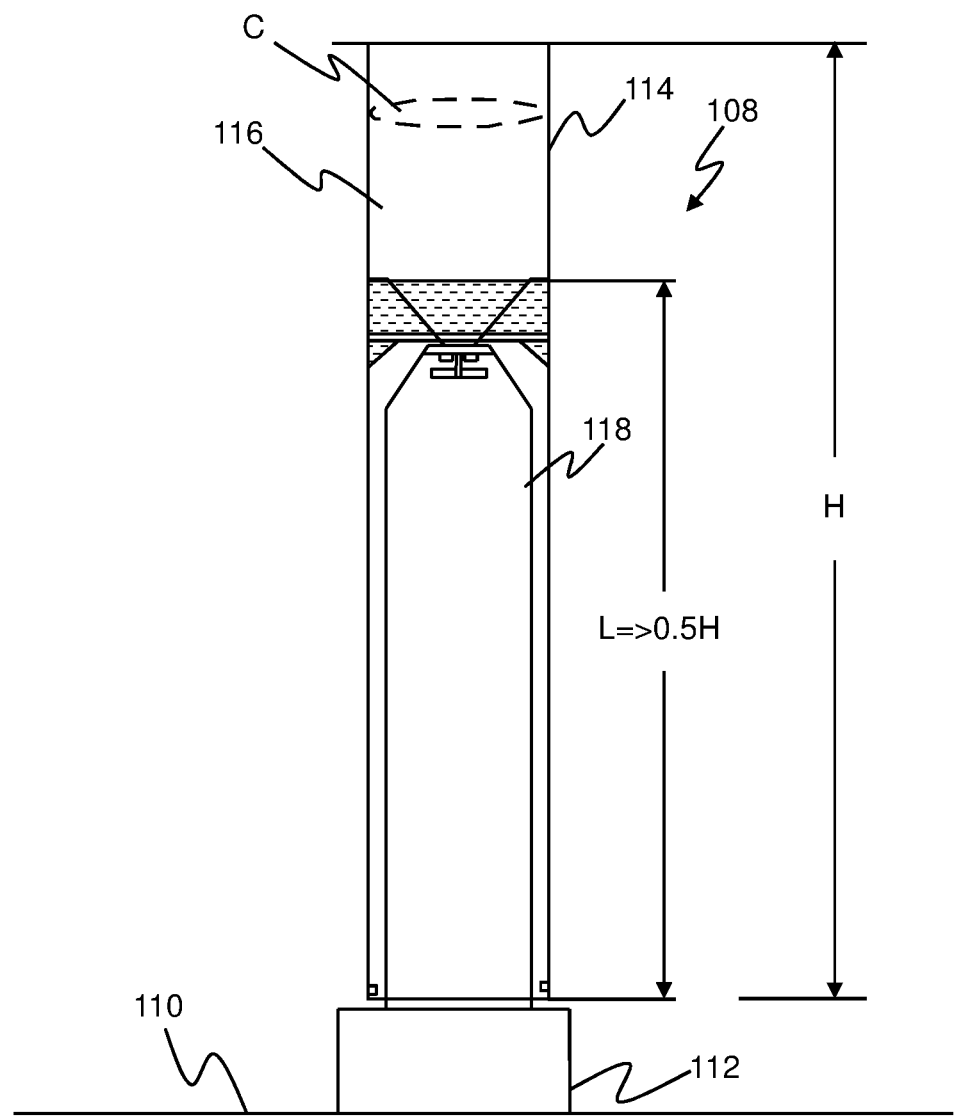
FIG. 2 is a front elevation view of a Magnus-type rotor employed in the propulsion system of FIG. 1.

Referring to FIG. 2, the Magnus-type rotor 108 is installed onto a foundation 112 provided on the deck 110 of the aquatic vessel 100. The Magnus-type rotors 108 include a rotor body 114 including a hollow region 116 defined therein. The propulsion system 102 includes a support tower 118 longitudinally extending within the hollow region 116 of the rotor body 114. The support tower 118 is optionally elongate and is configured to support, in a rotatable manner, the rotor body 114 of the Magnus-type rotor 108, as will be explained in detail hereinafter. The Figure also shows the circumference C of the rotor body 114, its height H and the height L of the support tower 118.

The present disclosure is directed towards methods of manufacturing the rotor body 114 of the Magnus-type rotor 108.

Figure 3:
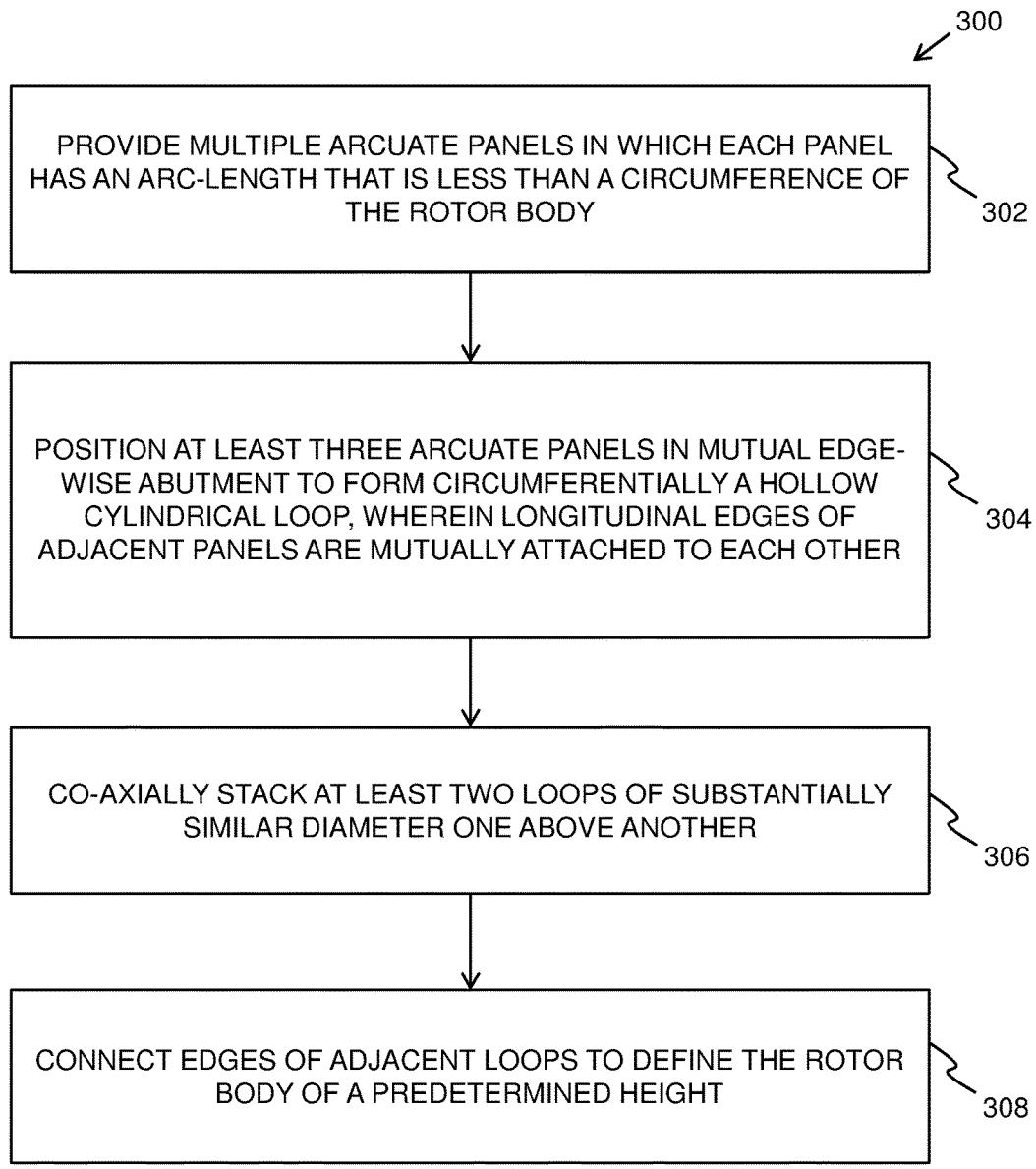
FIG. 3 is an illustration of steps of a method of manufacturing a rotor body pursuant to a first embodiment of the present disclosure.
Figure 4:
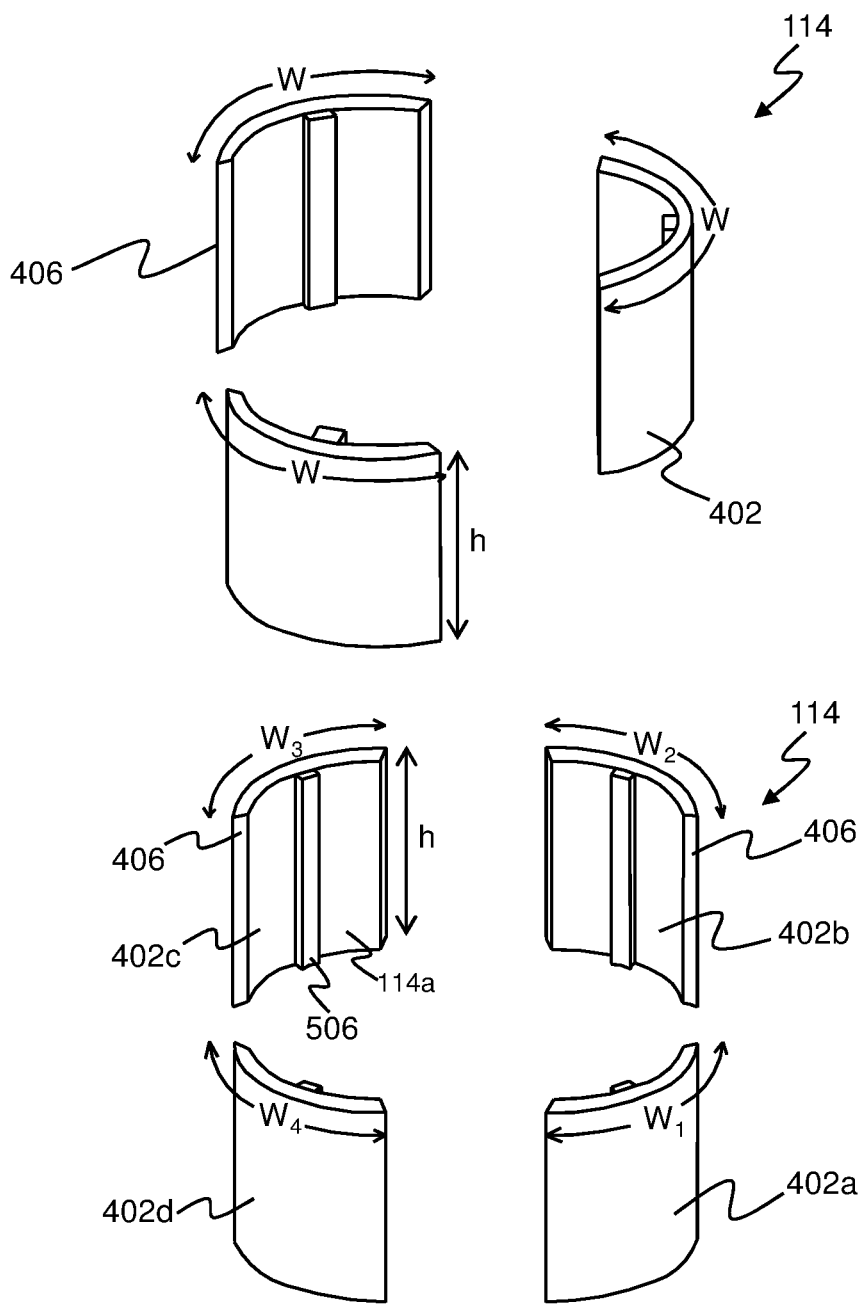
FIG. 4 is an exploded view of the rotor body in accordance with the first embodiment of the present disclosure.
Figure 5:
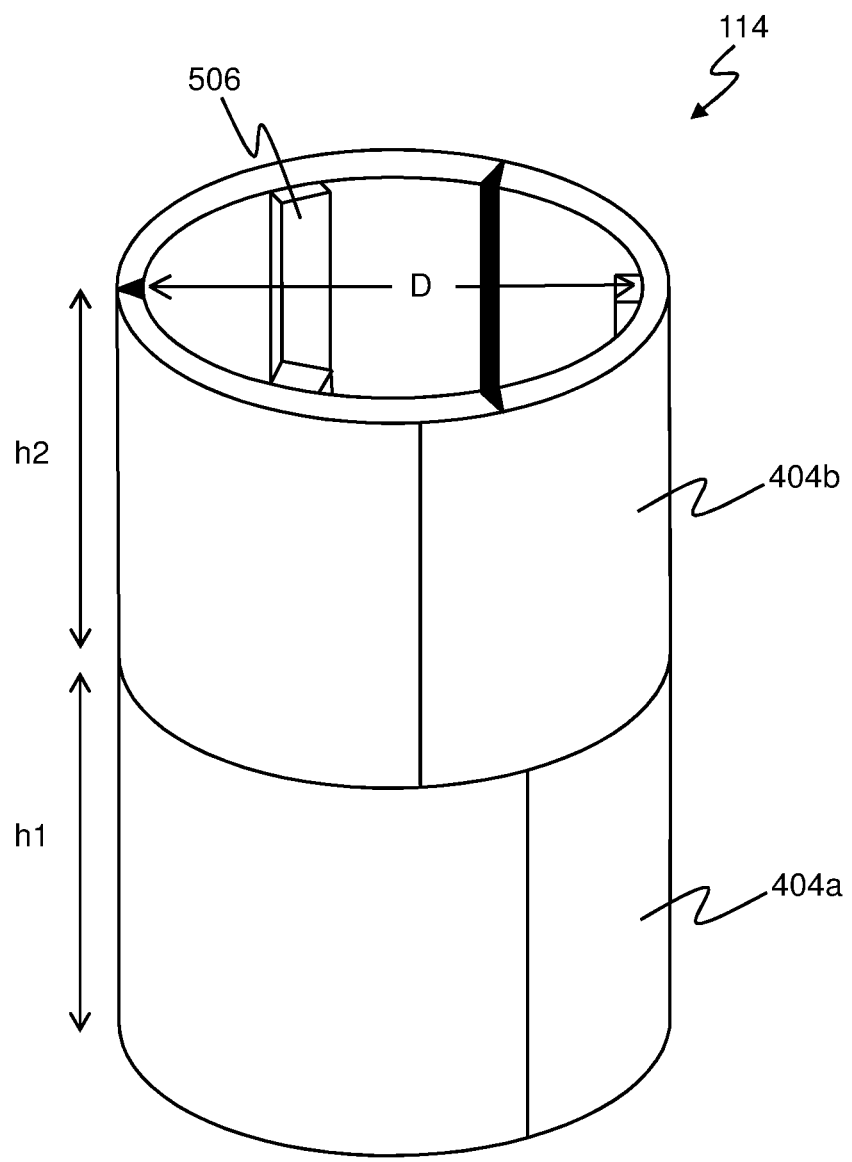
FIG. 5 is an assembled view of the rotor body in accordance with the first embodiment of the present disclosure.

In one embodiment, a first method 300, hereinafter simply referred to as the method 300, including associated steps 302 to 308, is provided for manufacturing the rotor body 114 as is explained in more detail in FIG. 3. At a step 302, the method 300 provides a plurality of arcuate panels 402a, 402b, 402c, and 40d, hereinafter collectively referred to as panels 402. Referring to FIGS. 2, 4, and 5, each of the panels 402 has an arc-length W which is less than a circumference C of the rotor body 114. The arc-length W, disclosed herein, refers to a length of the panels 402a, 402b, 402c, and 402d measured along their respective arcuate planes. Moreover, it is also possible that each of the arcuate panels 402a, 402b, 402c, and 402d can be of dissimilar arc lengths as indicated by W1, W2, W3, and W4 in FIG. 4. However, it is to be understood that such similar arc-lengths W or dissimilar arc-lengths W1, W2, W3, and W4 of the arcuate panels 402a, 402b, 402c, and 402d are less than the circumference C of the rotor body 114.

Referring again to FIG. 3, at the step 304, the method 300 includes positioning a plurality of arcuate panels 402, for example at least three such arcuate panels 402, in mutual edge-wise abutment to form circumferentially a hollow cylindrical loop 404. It will be appreciated that the present disclosure discloses an example of a minimum of three arcuate panels 402 to form each cylindrical loop 404. In various embodiments of the present disclosure, a number of panels used can be increased to more than three, for example, four panels (as shown in FIG. 5), five panels, six panels and so on depending on specific requirements of an application and/or imminent advantages envisioned in the manufacturing of the panels 402. Numerous benefits or advantages arising from the use of at least three arcuate panels 402 will be appreciated upon further perusal of the present disclosure.

As shown in FIG. 4, the longitudinal edges 406 of adjacent panels 402 may be mutually attached to each other by an adhesion process. Optionally, the longitudinal edges 406 can be mutually attached using an over-lamination process, or a fastening mechanism. The fastening mechanism optionally includes one or more of: adhesive fasteners, bolts, rivets, pins, and screws, but is not limited thereto. Moreover, the aforesaid methods of attaching are beneficially used in combination, such that a secure joint or attachment is created between longitudinal edges 406 of adjacent panels 402. For example, the adjacent panels 402 may be over-laminated i.e., by overlapping the adjacent panels 402, and adhered at the overlapped portions using adhesives. Alternatively, fusing or welding of mutually abutting edges 406 of the panels 402 is optionally employed. In addition, the over-laminated and adhered adjacent panels 402 can be with bolted, riveted, and/or screwed to accomplish beneficially a secured joint there-between. Although it is disclosed herein that the fastening mechanism includes adhesive fasteners, bolts, rivets, screws, and pins, it is to be understood that other types of fasteners commonly known in the art, such as, but not limited to, clamps, catch plates, hooks, and/or other equivalent structures are also considered to form part of the fastening mechanism. Accordingly, one of skill in the art will appreciate that numerous structures can be suitably adopted to attach adjacently located panels 402 and assist in forming the circumferential loop 404 of the present disclosure. Therefore, structures, mechanisms, and/or methods disclosed herein should be considered nominally and not as limiting to the scope of appended claims. As such, other structures, mechanisms, and/or methods are readily available to one or more persons skilled in the art and such other structures, mechanisms, and/or methods can be suitably implemented in lieu of the disclosed structures for the purposes of mutually attaching a pair of adjacently located panels 402.

With reference to the method 300 of the present disclosure, in one embodiment as shown in FIGS. 2 and 4, a height h of each panel 402a, 402b, 402c, and 402d is kept less than the predetermined height H of the rotor 114. Referring again to FIG. 3, it will be appreciated that at the step 304, the method 300 includes co-axially stacking at least two loops 404a and 404b of substantially similar diameter D (as shown in FIG. 5) one above another. As shown in FIG. 5, upon edge-wise abutment of the panels 402, the individual arc-lengths W1, W2, W3, W4; or W of the respective panels 402 together define the predetermined circumference C of the rotor body 114.

In a further embodiment, the step 304 of positioning a plurality of arcuate panels 402, for example at least three arcuate panels 402, in edge-wise abutment can include using panels 402 of substantially mutually similar mass properties therein. The term "mass properties" disclosed herein is to be regarded as the mass distribution in the material of the individual panels 402a, 402b, 402c, and 402d. If the panels 402a, 402b, 402c, and 402d are made to have mutually similar mass properties, then the cylindrical loop 404 formed from such panels 402 is to be regarded as being beneficially imparted with a uniform mass distribution. Consequently, the loop 404 beneficially has an equal weight distribution across its respective circumference C. Explanation pertaining to the advantages resulting from implementation of panels 402 with substantially similar mass properties, namely uniform mass distribution and equal weight distribution, will be provided later herein.

Referring again to FIG. 3, at the step 306, the method 300 further includes stacking at least two loops 404a, 404b of substantially similar diameter D co-axially one above another. As shown in FIG. 5, it will be appreciated that the loops 404a and 404b have mutually substantially similar diameters D and are co-axially stacked one above another.

Moreover, at the step 308, the method 300 includes connecting edges 410 of adjacent loops 404a, 404b to define the rotor body of the predetermined height H. With reference to FIGS. 2 and 4, it will be appreciated that the heights h1, h2 of the respective loops 404a and 404b, as defined by the height h of the respective panels 402 therein, together define the predetermined height H of the rotor body 114. In an embodiment, the heights h1, h2 of the respective loops 404a, 404b are optionally mutually substantially similar in magnitude, for example, h1 is optionally substantially equal to h2. Optionally, the individual panels 404a and 404b are of mutually dissimilar heights i.e., h1≠h2. It will be appreciated that flexible manufacturing techniques are optionally employed for fabricating the rotor body 114 from loops 404a, 404b of similar or dissimilar heights h1, h2 without limiting the scope of the present disclosure. However, it is to be noted that in this embodiment, the heights h1 or h2 of the respective loops 404a, 404b are each less than the total height H of the rotor body 114.

In an embodiment as shown in FIG. 5, adjacently positioned loops 404a, 404b are "counter-rotated" with respect to each other. "Counter-rotation", as disclosed herein, is beneficially regarded as the rotation of adjacently located loops 404a and 404b in opposite directions i.e., one loop 404a or 404b in the clockwise direction and the other loop 404a or 404b in the counter-clockwise direction. Counter-rotation is also optionally accomplished by rotating one adjacent loop 404a or 404b relative to the other adjacent loop 404a or 404b. The counter-rotation of the adjacent loops 404a, 404b is optionally carried out until the longitudinal edges 406 between panels 402 of the adjacent loops 404 are angularly offset from one another. The step of counter-rotating the adjacent loops 404a, 404b is optionally carried out before or after stacking the respective loops 404a, 404b. Such counter-rotation is beneficially implemented to ensure that joints between the longitudinal edges 406 of panels 404 from adjacent loops 404a. 404b do not fall in line with each other. Consequently, the arrangement or configuration of loops 404a, 404b, by counter-rotating thereof, potentially allows a manufacturer to improve the structural integrity of the rotor body 114 and/or obtain a more robust rotor body 114.

Moreover, the method 300 beneficially includes an optional additional step of balancing a weight of the rotor body 114 across its circumference thereof. Upon forming the rotor body 114, the rotor body 114 is beneficially tested for uneven rotation and/or wobbling. The rotor body 114 is beneficially mounted on a pre-designed balancing rig (not shown) that is configured to rotate the rotor body 114 at varying speeds and detect and/or measure any uneven rotation and/or wobbling of the rotor body 114. If there is a disparity in the spatial weight distribution across the circumference C of the rotor body 114, an inner surface 114a of the rotor body 114 is optionally affixed with one or more balancing members 506 as shown in FIG. 5. The balancing members 506 include, for example, but are not limited to, elongated containers that can be filled with sand, lead pellets or other heavy/weight-laden/dense materials therein. A location of each balancing member 506 is beneficially selected based upon an overall weight distribution across the circumference C of the rotor body 114.

Although it is disclosed herein that the entire rotor body 114 is tested at once in its entirety, it is also optionally feasible to test each loop 404*a*, 404*b* individually. Accordingly, in an alternative embodiment, the method 300 optionally includes balancing a weight of each loop 404*a*, 404*b* individually across its respective circumference C. To that end, once each loop 404*a* or 404*b* has been formed from the arcuate panels 402*a*, 402*b*, 402*c*, and 402*d*, the formed loop 404*a* or 404*b* can be tested for any uneven rotation and/or wobbling therein. Therefore, a manufacturer can optionally choose either to check the balance in the individual weights of each formed loop 404*a* or 404*b*, or to balance in respect of the cumulative weight of the rotor body 114. Optionally, the manufacturer can perform both checks i.e., for balance in the weight of each formed loop 404*a* or 404*b* on an individual basis as well as for balance in the weight of the total rotor body 114.

Referring to FIGS. 1 and 2, in an embodiment of the present disclosure, the rotor body 114 optionally has a diameter in the range of 20 meters to 60 meters. Moreover, the rotor body 114 optionally has a height H in the range of 10 meters to 40 meters. For example, the rotor body 114 optionally has a diameter of substantially 3 meters and optionally has a height H of 20 meters. In retrospect of aforementioned, studies have shown that, with the given aspect ratio of the rotor body 114 (i.e., a ratio of height to diameter), the wind forces can be large in the upper half of the rotor body 114 and especially at about the upper two-thirds of the height H of the rotor body 114. As such, the height H of the rotor body 114 is more than the height L of the support tower 118 and in reference to various embodiments of the present disclosure; it is hereby envisaged that the support tower 118 is ideally configured to support the rotor body 114 at more than 50% of the height H of the rotor body 114. For example, the support tower 118 may be sized to support the rotor body 114 at 70% of the height H of the rotor body 114. The support tower may be sized to support the rotor body at a height that is from 50, 55, 60, 65, 70, 75, 80 or 85% of the height of the rotor body up to 55, 60, 65, 70, 75, 80, 85, 90, 95 or even 100% of the height of the rotor body It is envisaged that, with appropriate configurations and relative sizing of the support tower 118 and the rotor body 114, rigidity can be imparted to the overall structure of the Magnus-type rotor 108.

Figure 6:
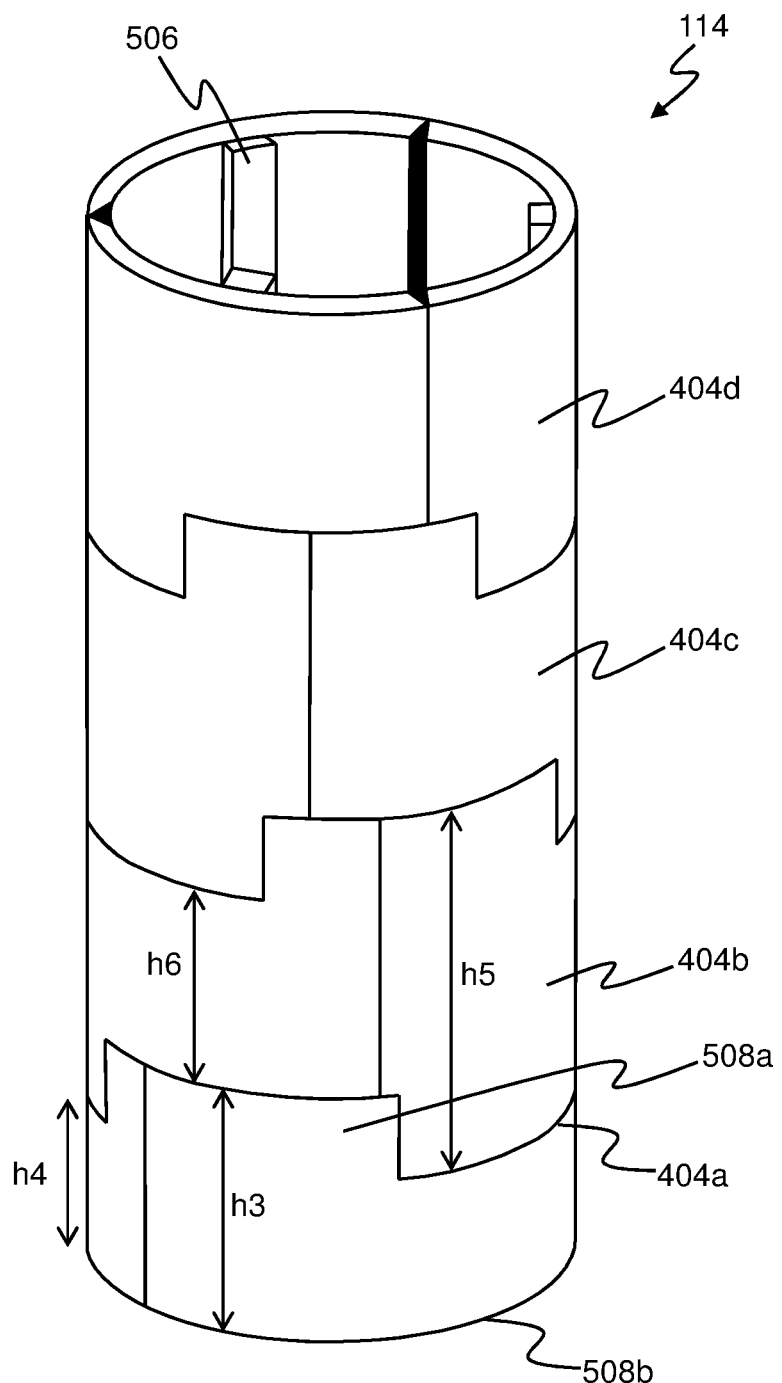
FIG. 6 is an assembled view of a rotor body in accordance with a first modified embodiment of the present disclosure.

As shown in FIG. 6, the rotor body 114 is shown including four loops 404*a*, 404*b*, 404*c*, and 404*d*. Although it has been disclosed herein that the loops 404*a* and 404*b* from the rotor body 114 of the first embodiment are optionally of similar or dissimilar heights h1, h2 (as defined on the basis of the heights h of the respective panels 402 therein), it is optionally possible to have different heights h for each panel 402 in the given loops 404*a*, 404*b*, 404*c*, and 404*d* as shown in the rotor body 114 of the first modified embodiment of FIG. 6.

Referring again to FIG. 6, the different heights can be, for example, h3, h4, h5, h6. The different heights of the individual panels give a staggered, tiered or toothed appearance to proximal ends 508*a* of the associated loops 404*c* and 404*b*. Upon stacking of the staggered, tiered or tooth shaped loops 404*c* and 404*d* in the first modified embodiment of the rotor body 114, the rotor body 114 is rendered with an inter-fitting pattern. However, distal ends or edges 508*b* of panels 402 from loops 404*c* and 404*d* of the rotor body 114 can be formed in a straight-cut profile to allow fitment with other higher assemblies, for example, the loop 404*b*, that are located subsequent or adjacent to the rotor body 114. Optionally, such a straight-cut profile at distal ends 508*b* of the panels 402 from loops 404*c* and 404*d* of the rotor body 114 is optionally provided to adhere to pre-defined design parameters and/or to achieve pre-defined operational characteristics from the rotor body 114. Therefore, it is hereby envisaged that modifications in the heights of individual panels 402 can be implemented to render various profiles to the loops 404*c* and 404*d*, such that the loops 404*c* and 404*d* accomplish a mutually inter-fitting or intermeshing pattern upon stacking one loop 404 over another. Such modifications should be taken in the illustrative and explanatory sense. Therefore, such modifications are nominal, namely optional, of the present disclosure, and in no way should be construed as limiting of the present disclosure.

Figure 7:
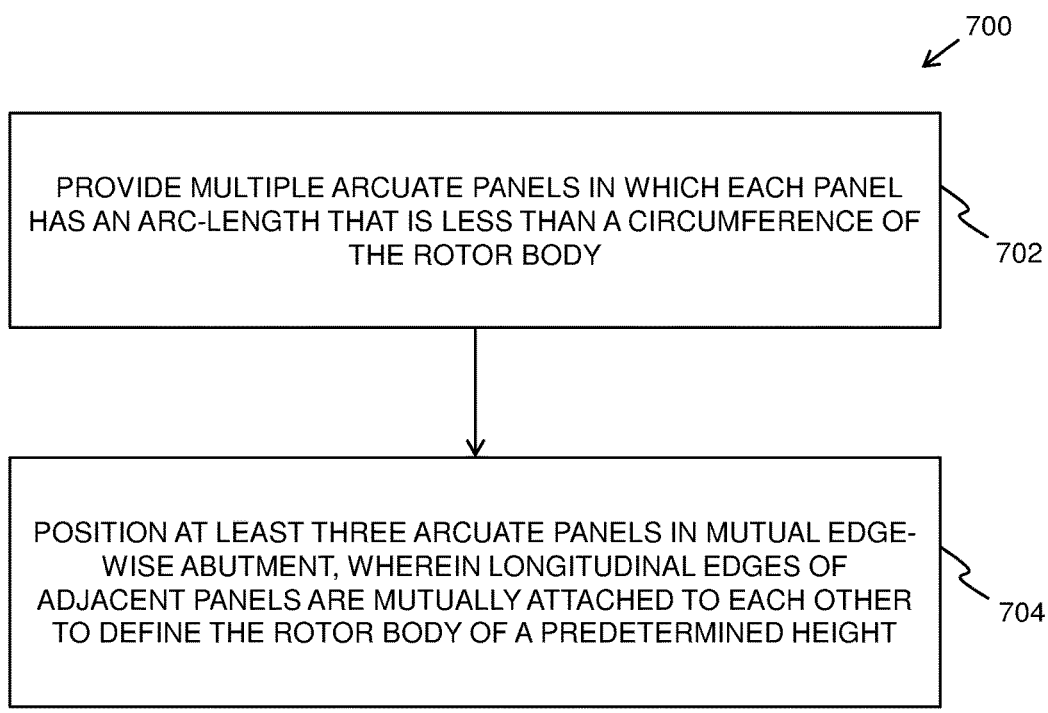
FIG. 7 is a method of manufacturing a rotor body pursuant to a second embodiment of the present disclosure.

FIG. 7 is an illustration of steps of a method 700 of manufacturing a rotor body 114 pursuant to a second embodiment of the present disclosure. Moreover, in FIGS. 8 and 9, there are provided illustrations in exploded and assembled views of the rotor body 114 of the second embodiment. Since the second embodiment rotor body 114 is generally reminiscent of the rotor body 114, components which are similar between the second embodiment rotor body 114 and the rotor body 114 will be annotated by similar numbers increased by 700.

Figure 8:
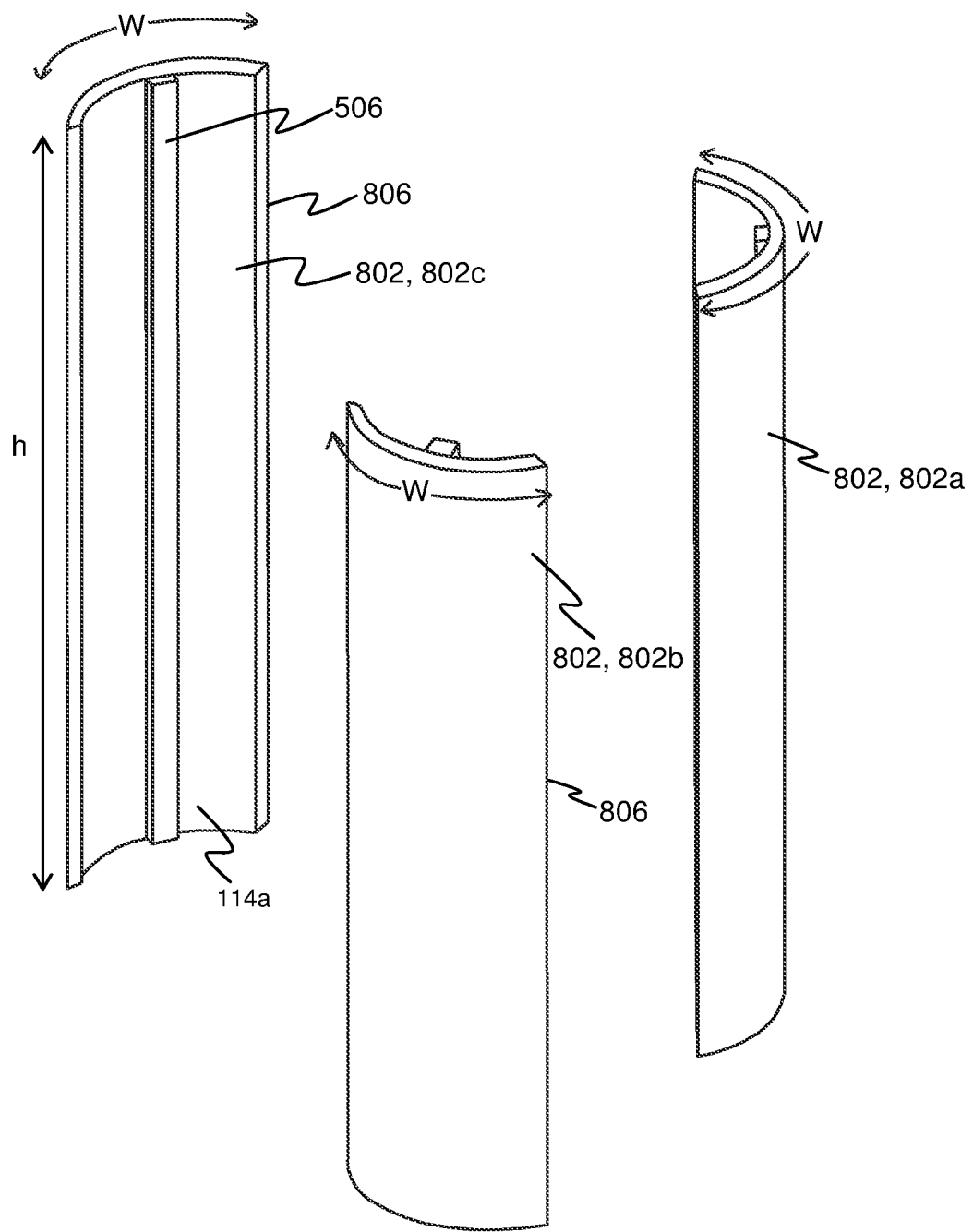
FIG. 8 is an exploded view of the rotor body in accordance with the second embodiment of the present disclosure.
Figure 9:
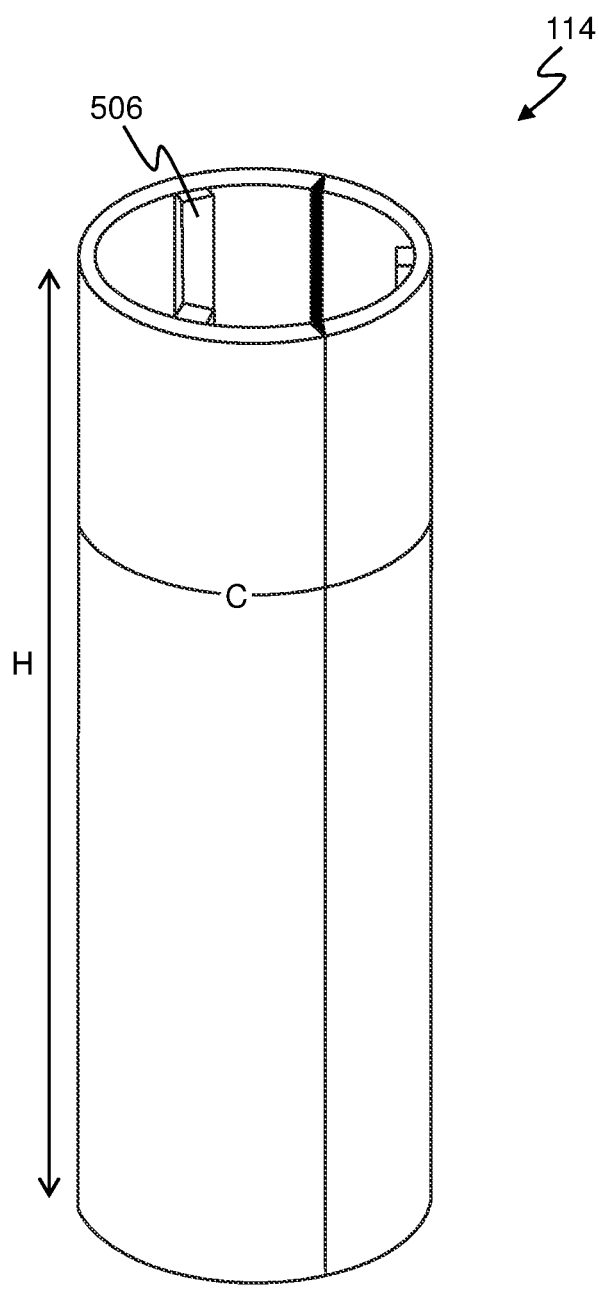
FIG. 9 is an assembled view of the rotor body in accordance with the second embodiment of the present disclosure.

Referring to FIG. 7, at a step 702, the method 700 includes providing a plurality of arcuate panels 802, wherein each of the panels 802 has an arc-length W less than the circumference C of the rotor body 114. As shown in FIGS. 8 and 9, it will be appreciated that the panels 802*a*, 802*b*, and 802*c* have an arc-length of W each. Referring again to FIG. 7, at a step 704, the method 700 further includes positioning the at least three arcuate panels 802*a*, 802*b*, and 802*c* in mutual edge-wise abutment, wherein longitudinal edges 806 of adjacent panels 802*a*, 802*b*, and 802*c* are mutually attached to each other to define the rotor body 114 of the predetermined height H. In the specific embodiment of FIGS. 8 and 9, the height h of each individual panel 802*a*, 802*b*, and 802*c* is equal to the height H of the rotor body 114 i.e., h=H. With reference to the second embodiment rotor body 114, it will be appreciated that the arcuate panels 802 are of a substantially elongate length as compared to the arcuate panels 402 of the first embodiment or the first modified embodiment of FIGS. 5 and 6 respectively. Therefore, it will be appreciated that the arcuate panels 802 span across the length h, so as to form the total height H of the rotor body 114.

It will be appreciated that the steps 302 to 308 of the method 300 and the steps 702 to 704 are only illustrative and other alternatives can also be provided where one or more steps are added, one or more steps are removed, or one or more steps are provided in a different sequence without departing from the scope of the present disclosure.

Embodiments of the present disclosure can be used for achieving or obtaining various desirable structural characteristics in rotor bodies and/or Magnus-type rotors such as, but not limited to, a low-weight, a high and uniform stiffness, an even mass distribution, an improved rigidity and/or structural integrity. With implementation of various embodiments disclosed herein, the rotor body is not easily deformed or centrifugally displaced from its rotation at varying speeds. Stable operation of the rotor body can also be achieved as the natural frequency or the Eigen frequencies of Eigen modes of the rotor body are kept high in magnitude.

Embodiments of the present disclosure also allow for economical manufacture, assembly, repair, and/or transportation of the arcuate panels. For example, due to their relatively small size, the arcuate panels can be produced by utilizing smaller manufacturing systems and shipped using small compact containers. Moreover, with flexibility to assemble arcuate panels of similar mass properties, the arcuate panels can be produced at multiple locations and thereafter assembled at a ship yard or a suitable facility. Numerous other benefits and/or advantages may be readily apparent to one having skill in the art and such advantages may be applicable to one or more embodiments of the present disclosure. However, such benefits and/or advantages are anticipated as being nominal to the present disclosure and should in no way limit the scope of the present disclosure and the appended claims herein. Moreover, advantages and/or benefits relating to one embodiment of the present disclosure should be construed as similarly relating to other embodiments disclosed herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

All directional references (e.g., upper, lower, upward, downward, left, right, leftward, rightward, top, bottom, above, below, vertical, horizontal, clockwise, and counterclockwise) are only used for identification purposes to aid the reader's understanding of the present disclosure, and may not create limitations, particularly as to the position, orientation, or use of the devices and/or methods disclosed herein. Joinder references (e.g., attached, affixed, coupled, connected, hinged, and the like) are to be construed broadly and may include intermediate members between a connection of segments and/or suggest relative movement between segments. As such, joinder references do not necessarily infer that two segments are directly connected and in fixed relation to each other.

Additionally, all numerical terms, such as but not limited to "first", "second", "third", or any other ordinary and/or numerical terms, should also be taken only as identifiers, to assist the reader's understanding of the various embodiments, variations and/or modifications of the present disclosure, and may not create any limitations, particularly as to the order, or preference, of any embodiment, variation and/or modification relative to, or over, another embodiment, variation and/or modification.

Similarly, adjectives such as, but not limited to, "articulated", "modified", or similar, should be construed broadly, and only as nominal, and may not create any limitations, not create any limitations, particularly as to the description, operation, or use unless specifically set forth in the claims.

In methodologies directly or indirectly set forth herein, various steps and operations are described in one possible order of operation, but those skilled in the art will recognize that steps and operations may be rearranged, replaced, or eliminated without necessarily departing from the scope of the present disclosure as set forth in the claims. It is intended that all matter contained in the above description or shown in the accompanying drawings shall be interpreted as illustrative only and not limiting of the present disclosure. Changes in detail or structure may be made without departing from the present disclosure as defined in the appended claims.

While certain exemplary embodiments have been described and shown in the accompanying drawings, it is to be understood that such embodiments are merely illustrative of and not restrictive on the broad present disclosure, and that this present disclosure not be limited to the specific constructions and arrangements shown and described, since various other modifications and/or adaptations may occur to those of skill in the art. It is to be understood that individual features shown or described for one embodiment may be combined with individual features shown or described for another embodiment. It is to be understood some features are shown or described to illustrate the use of the present disclosure in the context of functional segments and such features may be omitted within the scope of the present disclosure and without departing from the spirit of the present disclosure as defined in the appended claims.

The invention claimed is:

1. A method of manufacturing a rotor body of a Magnus-type rotor, wherein the method comprises:
    forming each of a plurality of hollow cylindrical loops by:
        (i) providing at least three arcuate panels made of at least one self-carrying composite material having a multilayer structure of a sandwich design including a core material and a balancing member within the multilayer structure, wherein each panel has an arc-length less than a circumference of the rotor body of the Magnus-type rotor;
        (ii) positioning the at least three arcuate panels in mutual abutment at two opposing edges of each arcuate panel;
        (iii) connecting the at least three arcuate panels together by attaching the opposing edges of adjacent arcuate panels to each other, to form circumferentially an individual hollow cylindrical loop usable as a part of the rotor body of the Magnus-type rotor; and
        (iv) circumferentially balancing a weight of the individual hollow cylindrical loop.

2. A method as claimed in claim 1, wherein the method further comprises:
    stacking, co-axially one above another, the plurality of hollow cylindrical loops; and
    connecting the edges of adjacent loops to define the rotor body of the Magnus-type rotor.

3. The method as claimed in claim 2, wherein a height of the arcuate panels is less than a height of the rotor body.

4. The method as claimed in claim 1, wherein the at least one self-carrying composite material is selected from the group consisting of fiberglass reinforced plastics materials, carbon reinforced plastics materials, glass reinforced plastics materials, aramid reinforced plastics materials, basalt reinforced plastics materials and combinations thereof.

5. The method as claimed in claim 1, wherein the arcuate panels are manufactured by using a resin infusion process.

6. The method as claimed in claim 1, wherein the edges of adjacent panels are attached to each other by employing at least one of an adhesion process, an over-lamination process, and a fastening mechanism.

7. The method as claimed in claim 2, wherein the edges of adjacent loops are attached to each other by employing at least one of an adhesion process, an over-lamination process, and a fastening mechanism.

8. The method as claimed in claim 6, wherein the fastening mechanism comprises at least one of adhesive fasteners, bolts, rivets, pins, and screws.

9. The method as claimed in claim 1, wherein the arcuate panels of one loop have similar mass properties.

10. The method as claimed in claim 2, wherein the method further includes counter-rotating adjacently positioned loops to offset the longitudinal edges of the panels in the co-axially stacked loops.

11. A Magnus-type rotor (108), comprising a support tower (118) and a rotor body (114), wherein the rotor body (114) comprises at least a plurality of hollow cylindrical loops, each comprising at least three arcuate panels (402, 802) made of at least one self-carrying composite material having a multilayer structure of a sandwich design including a core material and a balancing member within the multilayer structure, wherein each Panel has an arc-length (W) less than a circumference (C) of the rotor body, the arcuate panels being attached to each other at two opposing edges (406, 806) of each arcuate panel, to form circumferentially an individual hollow cylindrical loop (404) forming a part of the rotor body, wherein a weight of the individual hollow cylindrical loop has been circumferentially balanced.

12. The Magnus type rotor as claimed in claim 11, wherein the plurality of hollow cylindrical loops (404) are stacked co-axially one above another and connected to each other, each loop comprising at least three arcuate panels (402).

13. The Magnus type rotor as claimed in claim 12, wherein the opposing longitudinal edges (406) of the arcuate panels (402) in the co-axially stacked loops (404) are offset one from another.

14. The Magnus type rotor as claimed in claim 11, wherein an inner surface (114a) of the rotor body (114) is affixed with one or more further balancing members (506), wherein a location of each further balancing member is selected based upon an overall spatial weight distribution across the circumference (C) of the rotor body.

15. The Magnus type rotor as claimed in claim 11, wherein a height (H) of the rotor body (114) is more than a height (L) of the support tower (118).

16. The Magnus-type rotor as claimed in claim 15, wherein the support tower (118) is configured to support pivotally the rotor body (114) at more than 50% of the height (H) of the rotor body.

17. A nautical vessel (100) comprising at least one Magnus-type rotor (108) according to claim 13.

* * * * *